May 29, 1928.  
H. T. ROBERTS  
1,671,609  
VALVE  
Filed Feb. 19, 1923

Inventor:  
Henry T. Roberts  
By G. N. Cragg  
Atty.

Patented May 29, 1928.

1,671,609

UNITED STATES PATENT OFFICE.

HENRY T. ROBERTS, OF CHICAGO, ILLINOIS, ASSIGNOR TO THE BASSICK MANUFACTURING COMPANY, OF CHICAGO, ILLINOIS, A CORPORATION OF DELAWARE.

VALVE.

Application filed February 19, 1923. Serial No. 620,108.

My invention relates to valves and to nozzle structures which I have combined with the valves of my invention but to which combination of parts the invention is not to be limited.

The valve and nozzle structure of my invention are of particular service when employed in connection with lubricant ejecting devices used for supplying lubricant to bearings or other parts, though the invention is not to be thus restricted.

My improved nozzle structure enables the use of a lubricant applying implement upon bearings that are difficult of access. In carrying out this feature of my invention a nozzle tube is provided with a cap that has a T-shaped bore. The head portion of this bore extends but partially through the cap and receives one end of the tube, the imperforate portion of the cap at one end of the head of the bore serving to close the forward end of the tube. The tube is formed with a lateral opening that is aligned with the stem portion of the cap bore whereby there is formed a lateral outlet for the lubricant or other fluid. The portion of the cap through which the stem of the bore is formed projects laterally of the tube so that the discharge end of the device may readily be applied to parts that would be inaccessible or difficult of access.

The valve portion of the structure includes two hollow cases coupled end to end, the adjacent ends of these cases being open to permit passage of fluid from one case into the other, a packing ring clamped between the adjacent ends of said cases and having its opening aligned with the openings in the adjacent ends of the cases, and a valve for closing the opening in said ring and having the ring for its seat. The valve is preferably in the form of a ball which enters the ring opening, this ball being seated upon the portion of the ring surrounding the opening. The ring thus performs a double function. It serves as a packing to render fluid tight the joint between the two coupled hollow cases and it also serves as a seat for the valve.

The valve of my invention also desirably includes a seat for a valve closing coiled spring, this seat having a central opening and at last one radiating opening communicating with the central opening. The coiled spring within the valve case is laterally spaced apart from this case so that lubricant or other fluid may flow around the outside of the spring as well as through its bore. The radiating opening or openings extend to the space upon the exterior of the spring so that the fluid may flow through the spring seat from the space surrounding the spring as well as through the bore of the spring.

Figure 1:
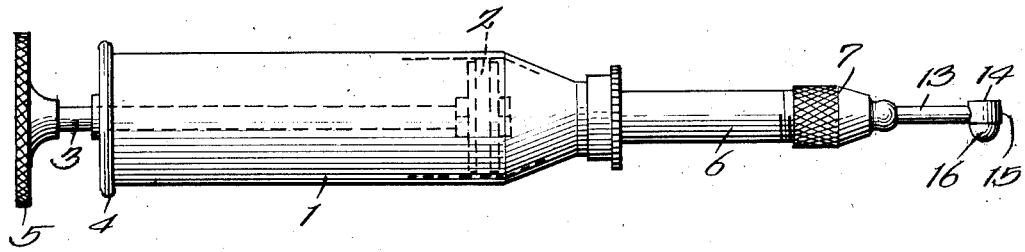
Figure 2:
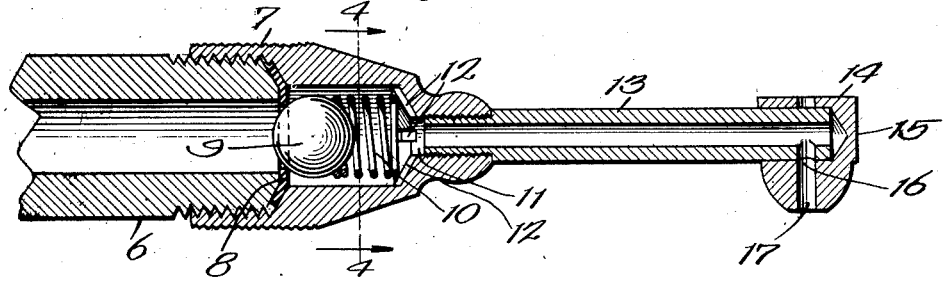
Figure 3:
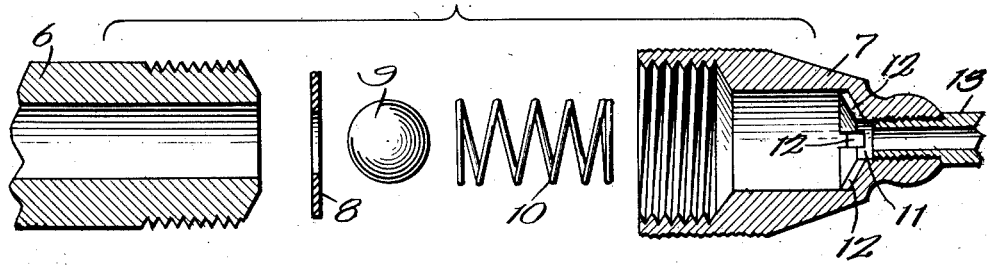
Figure 4:
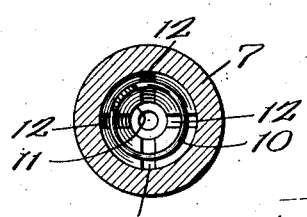

I will explain my invention more fully by reference to the accompanying drawing in which Fig. 1 is a view in elevation of a lubricant applying device constructed in accordance with the preferred embodiment of the invention; Fig. 2 is a longitudinal sectional view of the front end portion of the structure shown in Fig. 1, taken on a larger scale; Fig. 3 is a view showing some of the parts that are illustrated in Fig. 2 in separated relation; and Fig. 4 is a sectional view on line 4—4 of Fig. 2.

Like parts are indicated by similar characters of reference throughout the different figures.

The invention is shown in the drawing as being applied to a device for effecting the forcible discharge of lubricant upon bearings or other places where lubricant is to be employed. The device illustrated includes a lubricant holding barrel 1 which encloses a piston 2 having a stem 3 projecting through a removable cap 4 at the rear end of the barrel. This stem terminates in a head 5 by which the piston may be forced to move in the barrel either upon a straight longitudinal movement of the piston and its stem or upon a combined longitudinal and screwing movement of the piston and its stem, all as is well understood by those familiar with the art.

A pipe section or hollow case 6 is suitably assembled with the barrel 1 at the forward or outlet end of the barrel. The forward end of the case 6 is threaded upon its exterior and is screwed into another hollow case 7 to couple these two cases end to end to constitute the case 7 a continuation of the case 6, the adjacent ends of these cases being open to permit of passage of lubricant or other fluid from the case 6 into the case 7.

A packing ring 8, formed of rubber, fiber or any other suitable material, is clamped between the adjacent ends of the cases and has its opening aligned with the openings in these ends. A valve ball 9 is disposed within the case 7, this ball entering the opening in the ring 8 to close the valve which, in its closed position, is seated upon the portion of the ring surrounding the ring opening. The ring thus serves the double purpose of a packing to render fluid tight the union between the hollow cases 6 and 7 and also as a seat for the valve. Closing action is exerted upon the valve by means of a spring which is preferably a coiled spring 10 disposed within the interior of the hollow case 7, the forward end of this spring being seated against the forward end of the case 7 and the rear end of the spring pressing upon the ball to exert valve closing action thereupon. The spring is placed under compression by the forward movement of the ring 8 which occurs in screwing the two cases together. The surfaces of the cases between which the ring is clamped are conically tapered, these surfaces being substantially parallel and forwardly directed whereby the central portion of the ring is dished forwardly to place the spring under further compression. The forward end of the hollow case 7 is formed with a dished seat for the spring 10, this dished seat having a central opening 11 in direct communication with the bore of the spring. One or more radiating openings 12 extend from the central opening 11 to the space that intervenes between the side of the spring and the lateral wall of the case whereby fluid may not only pass through the bore of the spring through the spring seat, but also may pass from the space surrounding the spring through the spring seat.

The nozzle portion of the structure includes a nozzle tube 13 and a cap 14 upon the discharge end of the tube. This cap has a blind bore ending at the wall portion 15. The cap also has a through axial bore opening at one end at 17. The tube 13 enters the blind bore and is securely fastened therein. The tube 13 is formed with a lateral opening 16 which is aligned with the portion 17 of the through bore, whereby the discharge end of the passage of the implement is angular to the long tube 13. By this construction the discharge end of the implement may be inserted in places that would otherwise be difficult of access. The portion of the cap surrounding the stem portion 17 of the through bore may be suitably shaped to conform to the purpose for which the implement is intended.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Apparatus of the class described comprising a first conduit, a second conduit, a valve chamber connecting said conduits, a valve seat, a valve, a coil spring having a forward end entirely closed by said valve and a rear end surrounding the end of said second conduit, and laterally extending passageways connecting said second conduit with a part of said valve chamber exterior of said coil spring.

2. Apparatus of the class described comprising a first conduit, a second conduit, a valve chamber connecting said conduits, a valve seat, an imperforate valve therefor, valve seat, of smaller diameter than said a coil spring of smaller diameter than said chamber and having a forward end closed by said valve and a rearward end surrounding the end of said second conduit, said spring being designed to permit lubricant to pass from a part of said chamber exterior of said spring through the coils of said spring and into said second conduit, and special means beyond said spring for connecting said second conduit with a part of said chamber exterior thereof to provide for unusual conditions of operation of said device.

3. Conduit means for lubricating apparatus comprising, in combination, a valve chamber, a valve seat at the inlet end thereof, valve means adapted to cooperate with said valve seat, a coil spring for urging said valve means against said valve seat, an abutment at the outlet end of said valve chamber, an outlet of smaller diameter than said valve chamber, said spring confined between said valve means and said abutment and surrounding said outlet, and a passage extending transversely of said spring and at one end thereof to permit passage of lubricant through said valve chamber without passing between the coils of said spring.

In witness whereof, I hereunto subscribe my name this 13th day of February, A. D., 1923.

HENRY T. ROBERTS.